United States Patent [19]

Kunbargi

[11] Patent Number: 4,957,556

[45] Date of Patent: Sep. 18, 1990

[54] VERY EARLY SETTING ULTRA HIGH EARLY STRENGTH CEMENT

[76] Inventor: Hassan Kunbargi, 3166 Barrington #E, Los Angeles, Calif. 90066

[21] Appl. No.: 363,587

[22] Filed: Jun. 8, 1989

[51] Int. Cl.$^5$ .............................................. C04B 7/32
[52] U.S. Cl. ................... 106/693; 106/694; 106/695; 106/722
[58] Field of Search .............. 106/109, 89, 104, 97, 106/98

[56] References Cited

U.S. PATENT DOCUMENTS

| | | | |
|---|---|---|---|
| 3,155,526 | 11/1964 | Klein | 106/89 |
| 3,194,673 | 7/1965 | Schedel | 106/100 |
| 3,860,433 | 1/1975 | Ost et al. | 106/89 |
| 4,036,657 | 7/1977 | Mehta | 106/81 |
| 4,249,952 | 2/1981 | Davis, Jr. | 106/103 |
| 4,798,628 | 1/1989 | Mills et al. | 106/89 |

*Primary Examiner*—William R. Dixon, Jr.
*Assistant Examiner*—Melissa Bonner
*Attorney, Agent, or Firm*—Poms, Smith, Lande & Rose

[57] ABSTRACT

Methods for forming very early setting, ultra high strength cements and the cements so produced are claimed. The methods comprise forming a mixture of raw materials containing $SiO_2$, $Al_2O_3$, $CaO$, $Fe_2O_3$, and $SO_3$, respectively designated S, A, C, F, and $\bar{S}$ such that the overall molar ratio of A/F exceeds approximately 0.64 and the overall molar ratio of $\bar{S}/A+F$ is between approximately 0.35 and 0.25. This mixture is heated to n elevated temperature between 1,000° C. and 1,200° C. for a sufficient period of time to produce a clinker containing high concentrations of $C_4A_3\bar{S}$. The average amount of $C_4A_3\bar{S}$ is then determined and a final mixture is formed utilizing the high $C_4A_3\bar{S}$ clinker, C containing hydraulic or portland type cement and soluble $C\bar{S}$ anhydride to produce a final cement mixture having a $C_4A_3\bar{S}$ content of approximately 10% to 30% by weight, a soluble $C\bar{S}$ anhydride content of approximately 5% to 20% by weight, and the remainder being hydraulic or portland type cement. The cements so produced exhibit very early, ultra high strength ranging from 3,000 psi to 5,000 psi in one hour, 6,000 psi in one day, and 11,000 psi in 28 days.

15 Claims, No Drawings

VERY EARLY SETTING ULTRA HIGH EARLY STRENGTH CEMENT

FIELD OF THE INVENTION

Field of the Invention

The present invention relates in a broad aspect to fast setting high strength cement compositions and methods for their formation. More particularly, the present invention is directed to very early setting, ultra high strength cement compositions and methods for their formation which beneficially utilize the formation of ettringite to significantly enhance the compressive strength and early aging properties of the cement.

BACKGROUND OF THE INVENTION

Hydraulic cements, or cements which harden by reacting with water, are most typically illustrated by portland type cements. Portland cement concrete has been known for almost one hundred years and is among one of the most commonly used structural materials. Portland cements are classified into at least five major types according to chemical composition and differing properties resulting therefrom. General purpose portland cements typically contain approximately 60-65% calcium oxide, 20-24% silica, 4-8% aluminum and about 2-5% ferric oxide. Raw material sources for these mineral components include limestone, clay, shale, sandstone, bauxite and iron ore. Mixtures of these raw materials are processed through a kiln fired heat treatment (burning) at approximately 1400°-1600° C. (2500°-2900° F.) to produce a sintered or "clinkered" material, which is then pulverized with 4-5% gypsum to produce the final cement product.

For convenience of further description, the following standard cement industry abbreviations will be utilized to describe the composition of such fired materials:

H—represents water ($H_2O$)
C—represents Calcium Oxide (CaO)
A—Aluminum Oxide ($Al_2O_3$)
F—represents Ferric Oxide ($Fe_2O_3$)
M—represents Magnesium Oxide (MgO)
S—represents Silicon Oxide ($SiO_2$)
K—represents Potassium Oxide ($K_2O$)
N—represents Sodium Oxide ($Na_2O$)
S—represents Sulphur Trioxide ($SO_3$)

General purpose portland type cement (usually designated ASTM I) typically contains approximately 50% $C_3S$, 25% $C_2S$, 12% $C_3A$, 8% $C_4AF$, 5% $C\bar{S}$. Thus, the total amount of calcium silicates is approximately 75%, with the predominant silicate being $C_3S$. After hydration, such general purpose portland cements generally exhibit compressive strengths on the order of 1800 psi after three days of curing and 2800 psi after seven days of curing, as determined by the standard ASTM procedure C109.

In many forms of concrete construction this rate of strength development for general purpose portland type cement significantly adds to the costs of construction because the cast hydrated concrete must remain supported by forms during a period of time sufficient to allow it to develop adequate strength to permit removal of the forms and to allow additional construction.

Past efforts at overcoming this slow rate of strength development in general purpose portland cement have resulted in the production of high early strength portland cements such as ASTM III which differs from other cements by having higher amounts of $C_3A$ and/or $C_3S$. The minimum ASTM specification for type III portland cement compressive strength is 1800 psi at one day and 2800 psi at three days. However, such cements typically exhibit compressive strengths on the order of 2000-2500 psi at one day and may develop compressive strengths on the order of 5000 psi at seven days.

Nonetheless, there remains a great need to develop cements having much higher early strengths. For example, in the production of pre-cast, pre-stressed, concrete products, a compressive strength on the order of 3000-4000 psi at one day is often required. Additionally, in the construction and repair of highways, many days and even weeks of curing time are required before the highways may be utilized. Moreover, in the construction of concrete buildings and bridges where the cement matrix is cast into forms, it is necessary to allow days of curing time to allow the cement to develop sufficient strength for removal of the forms.

Other hydraulic cements that may or may not be high early strength are the so-called "calcium alumino sulfate" cements based upon $3CaO.3Al_2O_3.CaSO_4$, abbreviated as either $C_3A_3C\bar{S}$ or, preferably, $C_4A_3\bar{S}$. Typically, the primary characteristic of $C_4A_3\bar{S}$ cements is their expansiveness. Concrete made from portland cement together with sand, gravel, or other mineral aggregate typically undergoes shrinkage upon drying. This shrinkage is undesirable in that, among other reasons, it gives rise to cracks which ultimately weaken the set concrete. Addition of additives such as $C_4A_3\bar{S}$ counteracts this shrinkage and may or may not produce cements having early high strength.

For example, type K portland cement as disclosed in U.S. Pat. No. 3,155,526 (Klein) uses the expansive property upon hydration of $C_4A_3\bar{S}$ in the presence of free C and $C\bar{S}$ to produce expansive cement components having strengths in the range of standard portland cement. Similarly, U.S. Pat. No. 3,860,433 (Ost et al.) discloses a high early strength cement containing $C_4A_3\bar{S}$, $C\bar{S}$, and $C_2S$, which exhibits compressive strengths of at least 2900-4000 psi within 24 hours following hydration.

In spite of these advances in the production of early setting high strength cement, as noted above, the development of portland type cements having even greater compressive strengths and higher rates of strength development than those presently available would be of great economic benefit to the construction industry. Accordingly, it is a particular object of the present invention to provide methods for the production of very early setting, ultrahigh strength cement compositions which following hydration, will produce compressive strengths on the order of 3000-5000 psi within one hour, on the order of 7000 psi within one day.

It is a further object of the present invention to provide methods for the production of very early setting, ultra high strength cement compositions which will produce compressive strengths in excess of 10,000 psi within twenty-eight days following hydration.

It is an additional object of the present invention to provide methods for the production of very early setting, ultra high strength cement compositions which are burned at low temperatures.

It is yet an additional object of the present invention to provide methods for the production of very early setting, ultra high strength cement compositions which beneficially utilize the formation of ettringite crystals to strengthen the hydrated cement.

It is a further additional object of the present invention to provide methods for producing very early setting, ultra high strength cement compositions which are particularly well suited for use in cold temperatures due to their high heats of hydration during their final set.

It is a further additional object of the present invention to provide methods for producing very early setting, ultra high strength cement compositions which achieve very early ultra high strength through the advantageous utilization of combined hydrated ettringite ($C_6A\bar{S}_332H$.) and calcium aluminate hydrate ($CA.10H$).

SUMMARY OF THE INVENTION

These and other objects are achieved by the methods and cement compositions of the present invention which utilize low temperature burning of specific mixtures of raw materials to produce, in the kiln, special clinkers having high concentrations of $C_4A_3\bar{S}$ which are mixed with hydraulic or portland type cement and $C\bar{S}$ in accordance with a unique mixing formula. When hydrated, the resulting cement compositions produce extremely high strength characteristics in an unusually short period of time and ultimately cure to previously unachievable compressive strengths through the combined action of the aqueous phases of $C_6A\bar{S}_3$ and $CA$.

The first step of the method for producing the very early setting ultra high strength cement compositions of the present invention involves the formation of a mixture of limestone, gypsum and bauxite, kaolonite or other high alumina clay to provide the raw materials $S, A, C, F$, and $\bar{S}$. This mixture preferably has an overall molar ratio of $A/F$ greater than or equal to approximately 0.64 and $\bar{S}/A+F$ between approximately 0.35 and 0.25.

In contrast to the known, prior art, methods of cement production which fire their raw material mixtures at temperatures above 1200° C., the mixture produced in accordance with the method of the present invention is heated to an elevated temperature between 1000° C. and 1200° C. for a sufficient period of time to form a clinker having a high concentration of $C_4A_3\bar{S}$. It should be emphasized that heating the mixture of the present invention to a temperature greater than 1200° C. will decompose the desired $C_4A_3\bar{S}$. Thus, the method of the present invention produces the $C_4A_3\bar{S}$ phase in the kiln by burning the clinker at reduced temperature.

Once the clinker has been formed, the average amount of $C_4A_3\bar{S}$ is determined and a final mixture is formed by combining the clinker with hydraulic or portland type cement and soluble $C\bar{S}$ anhydride in accordance with the design formula $C_4A_3\bar{S}+2C+2C\bar{S}=C_6A\bar{S}_3\cdot aq+2CA\cdot aq$ so that the final mixture includes a $C_4A_3\bar{S}$ content of approximately 10-30% by weight, 5-25% by weight soluble $C\bar{S}$ anhydride, with the remaining 45-85% by weight being hydraulic or portland cement.

Because of the narrow temperature range between 1000° C. and 1200° C. at which $C_4A_3\bar{S}$ is stable in the kiln, the method of the present invention requires state of the art kiln temperature control. Because contemporary cement kilns do not have temperature control at the burning zone itself, the temperature control is preferably carried out utilizing the benefit of x-ray diffraction techniques to periodically analyze the clinker for the proper content of $C_4A_3\bar{S}$. Those skilled in the art will appreciate that other forms of clinker analysis may be utilized, though x-ray diffraction is preferred.

The cement compositions produced in accordance with the method and mixing formula of the present invention, following hydration, produce ultra high strength early setting cements having compressive strengths on the order of 3000 psi within one hour, 6000 psi within twenty-four hours and 10,000 psi within twenty eight days. Thus, the cement compositions so produced are particularly well suited for use in concrete construction where the reduction in setting time will have significant economic advantage. Moreover, the previously unattainable compressive strengths exhibited by the cement compositions of the present invention provide significant construction advantages such as reductions in structural size and weight without corresponding reductions in strength. Additionally, the high heats of hydration of the compositions of the present invention prevent the hydrated cements from freezing in cold temperatures, enabling construction to continue at temperatures below 0° C.

Further objects and advantages of the cement compositions produced in accordance with the teachings of the present invention, as well as a better understanding thereof, will be afforded to those skilled in the art from a consideration of the following detailed explanation of preferred exemplary embodiments thereof.

DETAILED DESCRIPTION OF EXEMPLARY EMBODIMENT

As noted above, cement compositions incorporating $C_4A_3\bar{S}$ have been known in the art for almost 50 years. When hydrated in the presence of $C\bar{S}$ and $C$, $C_4A_3\bar{S}$ reacts to produce expansive crystals of ettringite ($C_6A\bar{S}_3\cdot aq$) according to the formula:

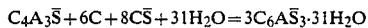

$$C_4A_3\bar{S}+6C+8C\bar{S}+31H_2O=3C_6A\bar{S}_3\cdot 31H_2O$$

These expansive crystals have been used in the past to offset the normally occurring shrinkage in general purpose portland type cements. However, when $C_4A_3\bar{S}$ is hydrated uncontrollably with gypsum in portland cement, it produces an expansive reaction that is destructive to the concrete.

Though a number of prior art patents have disclosed a variety of methods for controlling such expansive reactions in hydrated portland cement, none has been able to produce the very early setting, ultra high strength cement of the present invention. $C_4A_3\bar{S}$ has been utilized as a constituent in modified cement compositions, including some high early strength compositions, yet none of these compositions successfully differentiate between the gypsum phases present in the reaction. Rather, such compositions utilize the stoichiometric production of expansive ettringite crystals in accordance with the above-noted formula.

Moreover, in spite of the long history of cement production and use incorporating $C_4A_3\bar{S}$, the prior art is devoid of processes which effectively produce $C_4A_3\bar{S}$ in the cement kiln during the burning process. Typically, the well established procedures for producing portland type cement and variations thereof utilize a rotary kiln heat treatment in excess of 1,200° C. to sinter or clinkerize the raw materials. These high temperatures are utilized because the desirable silicates, $C_3S$ and $C_2S$, start to form at temperatures around 1,300° C. and are stable above temperatures of 1,500° C. In contrast to these silicates, calcium alumino sulfate, $C_4A_3\bar{S}$, is not thermodynamically stable at temperatures above 1,200° C. and actually decomposes at such elevated temperatures. Rather, $C_4A_3\bar{S}$ begins to form at temperatures of approximately 1,000° C. and becomes stable at approximately 1,100° C. Thus, because of this difference in temperature stability, commercially producing cement clinkers containing both $C_3S$ and $C_2S$ as well as $C_4A_3\bar{S}$ has been difficult, if not impossible with existing cement production technology and kiln controlling art.

Accordingly, in contrast to the prior art cement producing methodologies, the methods and compositions of the present invention utilize special mixing formulas to design raw material mixes which in the cement kiln itself produce unique clinkers having high concentrations of $C_4A_3\bar{S}$. Further, regardless of the ability of the special clinkers so produced to become hydraulic cement upon grinding and hydration, when mixed with portland cement and soluble calcium sulfate anhydride according to the teachings of the present invention, these unique clinkers produce very early setting, ultra high strength cements having compressive strengths ranging from 3,000 psi in one hour, following hydration to 6,000 psi in twenty-four hours and to 10,000 psi in twenty-eight days.

Before proceeding further, for purposes of explanation and without wishing to be bound to this theory, it has been determined that the method of the present invention produces unique cement composition which, following hydration, incorporate crystals of ettringite and calcium aluminate hydrate. It is believed that the needle like crystals of ettringite and calcium aluminate hydrate function to strengthen the hydraulic concretes so produced by forming networks of reinforcing micro fibers. This internal three-dimensional reinforcing fiber matrix, in conjunction with the CA·aq phase which occurs in high alumina cement, combines to produce the previously unattainable very early, ultra high strength characteristics of the cement compositions of the present invention. Prior art cement compositions have been unable to combine ettringite or $C_6A\bar{S}_3$·aq and CA·aq and $C_3S$·aq phases in a single cement because of the excessive kiln temperatures utilized. Those skilled in the art will appreciate that the foregoing proposed mechanism for the properties of the cement compositions of the present invention is theoretical only and does not limit the scope or content of the instant invention.

As noted above briefly, the first step in the method of the present invention is to produce a special cement clinker containing high amounts of $C_4A_3\bar{S}$ in the kiln. The raw materials for this clinker are those commonly known and used for the production of ordinary portland cement clinkers, namely: high alumina clay or bauxite or kaolonite, limestone and gypsum. Those skilled in the art will appreciate that these raw materials are sources of S, A, C, F and $\bar{S}$, which are, respectively $SiO_2$, $Al_2O_3$, CaO, $Fe_2O_3$, and $SO_3$. These raw materials are combined in accordance with the teachings of the present invention such that the mixture formed has an overall molar ratio of A/F greater than or equal to approximately 0.64 and a molar ratio of $\bar{S}$/A +F between approximately 0.35 and 0.25.

This raw material design has been determined based upon the following criteria. First, it is known that small amounts of impurities will naturally occur in the raw materials utilized to form the raw material mix. The impurities normally encountered include sodium oxide ($Na_2O$), potassium oxide ($K_2O$), magnesium oxide (MgO) and the like. However, because of the unique composition of the raw materials mix of the present invention, these impurities do not have significant adverse effects upon the formation of $C_4A_3\bar{S}$ in the kiln.

Additionally, in accordance with the teachings of the present invention, C is going to react with alumina and sulfates to form $C_4A_3\bar{S}$. Any iron present in the raw materials will most likely substitute for the alumina in the $C_4A_3\bar{S}$ phase, but will not form $C_4AF$ or $C_2F$ as long as the ratio of A/F is greater than 0.64. Any silica present in the raw materials will react with the remaining C to form $C_2S$ at the clinkerization temperature utilized. However, this formation is secondary to the formation $C_4A_3\bar{S}$. Moreover, $C_4A_3\bar{S}$ will be in equilibrium with the silicate phases as long as the ratio of $\bar{S}$/A +F is between approximately 0.25 and 0.35. If this ratio is less than approximately 0.25, the gehelinite phase or $C_2AS$ will be dominant. Conversely, if the ratio exceeds approximately 0.35, $C\bar{S}$ will be the dominant phase and $C_3A$ will be formed in equilibrium with it.

Similarly, impurities such as sodium oxide (N) and potassium oxide (K) will react with the sulfate present in the raw mix composition and the remaining sulfate will react to form $C_4A_3\bar{S}$ without significant adverse effect on the very early setting, ultra high strength characteristics of the cement compositions produced. Any uncombined $\bar{S}$ will react with C to form $C\bar{S}$ and the remaining C will react to form $C_2S$ with silica.

Those skilled in the art will also appreciate that the design of the raw material mix of the present invention can be performed using traditional chemical analysis techniques of the raw materials utilized. For example, assuming an exemplary raw material mix is formed from high alumina clay, limestone and gypsum containing S, A, C, F, M, K, $\bar{S}$ and L.I.O. The following ratios can be utilized in accordance with the teachings of the present invention to design the raw material mix.

(1) The amount of sulfate in $K_2SO_4 = 0.42\ K_2O$ (2) The amount of sulfate in $Na_2SO_4 = 0.65\ Na_2O$ (3) The amount of $C_4A_3\bar{S} = 1.995\ Al_2O_3 + 1.63\ Fe_2O_3 + 1.64\ Mn_2O_3$ (4) The amount of sulfate in $C_4A_3\bar{S} = 0.26\ Al_2O_3 + 0.17\ (Fe_2O_3 + Mn_2O_3)$ (5) The amount of calcium in $C_4A_3\bar{S} = 0.73\ Al_2O_3 + 0.47\ (Fe_2O_3\text{'}Mn_2O_3)$ (6) The amount of $C\bar{S}\ 1.7\ [\bar{S} - (0.65\ Na_2O + 0.425\ K_2O + 0.26\ Al_2O_3 + 0.17\ (Fe_2O_3 + Mn_2O_3))]$ (7) The amount of C in $C\bar{S} = 0.41\ C\bar{S}$ (8) The amount of C in $C_2S = 1.87\ S$ (9) The total required amount of $C = 0.55\ Al_2O_3 + 0.35\ (Fe_2O_3 + Mn_2O_3) + 1.87\ S + 0.7\ \bar{S} - 0.45\ Na_2O - 0.30\ K_2O$

(10) The total required amount of $\bar{S} = 0.65\ Na_2O + 0.425\ K_2O + 0.26\ Al_2O_3 + 0.17\ (Fe_2O_3 + Mn_2O_3)$ As noted above, the temperature range where $C_4A_3\bar{S}$ is stable varies between approximately 1,000° C. and 1,200° C. Accordingly, the previously produced mixture of raw materials is heated to an elevated temperature between these relatively narrow limits for a sufficient period of time to form the desired clinker having a high concentration of $C_4A_3\bar{S}$. This time period will vary depending upon the composition of the mixture and the kiln geometry will range from fractions of one hour to several hours or more. The high concentration of $C_4A_3\bar{S}$ will range between approximately 15% and 75% by weight.

It should be noted that the present state of the kiln temperature control art does not involve traditionally understood temperature controls at the burning zone. Typically, the control of the clinker temperature in the kiln is carried out by wet chemical analysis for free C (free lime). For example, the design formulas for traditional portland cement raw materials permit the presence of predetermined amounts of free C in the clinker. If wet chemical analysis of the clinker determines that the amount of free C is less than the design amount, the clinker is overburning and the kiln temperature needs to be reduced. Conversely, if the analyzed amount of free C is higher than the design amount, the clinker is being underburned and the kiln temperature must be raised.

However, such wet chemical methods may not be practically applicable to the production of clinkers having high weight percentages of $C_4A_3\bar{S}$ as taught by the present invention. Wet chemical analysis may be deceiving in this context because the aluminua, clay, bauxite and the like, contain S. This silica will react with calcium and the wet chemical methods may not indicate which phase is currently present in the clinker.

Accordingly, a preferred method for controlling the elevated temperatures of the heat treatment of the present invention utilizes periodic x-ray diffraction analysis of samples taken from the heated mixture rather than wet chemistry. As with the wet chemical methods of analysis, the previously described formulas of the present invention allow the determination of a design amount of $C_4A_3\bar{S}$. By preparing a precalibrated x-ray diffraction curve based upon laboratory reference standards for quantitatively analyzing the amount of $C_4A_3\bar{S}$ present in known reference samples, it becomes possible to periodically remove samples from the heated mixture and to quantitatively analyze them for the proper design content of $C_4A_3\bar{S}$ through x-ray diffraction analysis. Then, as with traditional wet chemistry methods for kiln control, the temperature of the heated mixture can be adjusted either up or down to produce the high concentration of $C_4A_3\bar{S}$ as designed in the raw material mix.

It should be emphasized that the elevated temperature ranges necessary to produce the $C_4A_3\bar{S}$ containing clinker of the present invention are relatively narrow when compared to traditional cement clinkerization temperatures. Accordingly, careful temperature control through x-ray diffraction analysis or some other method of fine temperature control, should be practiced to produce stable $C_4A_3\bar{S}$ phases in the clinker.

Those skilled in the art will also appreciate that an exemplary x-ray diffraction precalibrated curve can be prepared by conducting a number of laboratory trial design burns of the desired raw material mix. The trials should include underburning, overburning and burning at the correct temperature. The amount of $C_4A_3\bar{S}$ in each trial burn can then be quantitatively analyzed through x-ray diffraction and compared to ASTM standard curves for quantitatively calculating the contents of $C_3S$ and $C_2S$, $C_3A$ and $C_4A_3\bar{S}$.

During production of the actual commercial clinker in accordance with the present invention, a sample of the heat treated raw material will preferably be taken from the kiln approximately each one-half hour or hour to be analyzed quantitatively by x-ray diffraction. To facilitate this analysis an x-ray diffraction machine can be computerized to be calibrated to the preburning trials.

Once the clinker has been properly clinkerized the next step in the production of the cement compositions of the present invention involves determining the average amount of $C_4A_3\bar{S}$ present in the clinker. Typically, the clinker so produced will not have cementitious values itself upon grinding. Accordingly, the next step of the present invention involves forming a final mixture of the clinker with C containing portland type cement and soluble $C\bar{S}$ anhydride such that the composition of the final mixture includes a $C_4A_3\bar{S}$ content of approximately 10% 30% by weight and a soluble $C\bar{S}$ anhydride content of approximately 5%–25%. Mixing the special clinker of the instant invention with hydraulic or portland type cement is a preferred technique because it incorporates $C_3S$ into the cement by providing free lime and $C_3S$ to the mixture.

In contrast to the prior art methods of cement production utilizing the known stoichiometric reaction of $C_4A_3\bar{S}$ to produce expansive crystals, the method of the present invention forms the final mixture of the high $C_4A_3\bar{S}$ containing clinker according to the following aqueous mixing formulas:

$$C_4A_3\bar{S} + 2C = C_4A\bar{S}\cdot aq + 2CA\cdot aq \qquad \text{I}$$

$$C_4A_3\bar{S}\cdot aq + 2C\bar{S} = C_6A\bar{S}_3\cdot aq \qquad \text{II}$$

by adding I+II the following aqueous mixing formula is produced.

$$C_4A_3\bar{S} + 2C + 2C\bar{S} = C_6A\bar{S}_3\cdot aq + 2CA\cdot aq$$

Those skilled in the art will appreciate that the $CA\cdot aq$ phase in the cement produced in accordance with the teachings of the present invention is the principle phase present in high alumina cement and, it is believed, that the early strength in such cements is due to the presence of this phase. However, unlike the prior art cement compositions, following hydration the cement compositions of the present invention produce a concrete including the $CA\cdot aq$ phase, the $C_3S\cdot aq$ phase as well as the $C_3S\cdot aq$ and $C_6A\bar{S}\cdot aq$ ettringite phase without the adverse effect of the $C_{12}A_7\cdot aq$ phases which suffers crystal transformation after several years following hydration.

Those skilled in the art will also appreciate that the design mix of the cement compositions of the present invention can be modified to produce a wide variety of desirable very early setting, ultra high strength characteristics. Additionally, various additives can be incorporated into the cement to provide additional desirable properties. Similarly, the setting time of the cement compositions of the present invention can be controlled through the adjustment of the mixing proportions of the three main raw material components.

For example, in cold or severe weather conditions the setting time may increase from fifteen minutes to approximately two hours. Thus a suitable accelerator, such as aluminum sulfate or iron sulfate may be incorporated into the cement to increase the rate of cure of the cement. In addition to those accelerators previously noted, any chloride accelerator used for portland cement can also be used with the cement compositions of the present inventions. Additionally, a citric acid retarder may be added to the cement compositions of the present invention to increase the initial set up time to something on the order of two hours. However, it should be appreciated that an initial set time of fifteen minutes following hydration is an ideal time for mixing the cement with a super plasticizer to reduce the mixing water or concrete slump.

It should also be appreciated that the new cement compositions produced in accordance with the teaching of the present invention are water impermeable, sulfate resistant, and non-shrinking compositions. Moreover, the cement compositions are also sea water resistant. For increased resistance to freeze and thaw, however, addition of super-plasticizer is recommended. A further understanding of the exemplary cement compositions of the present invention will be afforded to those skilled in the art from the following non-limiting examples:

EXAMPLE I

In accordance with the method of the present invention a mixture of limestone, gypsum, and high alumina clay was produced to form a raw mixture for a high $C_4A_3\bar{S}$ clinker. The components of the mixture were combined in the form of dry powders. The chemical analysis of the raw materials was as follows:

|  | Clay | Limestone | Gypsum |
| --- | --- | --- | --- |
| $SiO_2$ | 32.00% | 2.00% | 1.00% |
| $Al_2O_3$ | 55.00% | 0.70% | 0.50% |
| CaO | 1.50% | 55.00% | 34.00% |
| $Fe_2O_3$ | 1.00% | 0.50% | 0.20% |
| MgO | 0.26% | 0.60% | 0.60% |
| $K_2O$ | 2.60% | 0.15% | 0.05% |
| $SO_3$ | 3.50% | 0.10% | 43.00% |
| L.O.I. | 4.00% | 41.00% | 21.00% |

Utilizing the mixing formulas of the present invention it was determined that a clinker containing an average of approximately 32% $C_4A_3\bar{S}$ could be produced from these raw materials by mixing 55% by weight of the limestone with 20% by weight of the gypsum and 25% by weight of the clay. This raw material mixture was fired at a temperature between 1,000° C. and 1,200° C. to produce high $C_4A_3\bar{S}$ clinker. The clinker so produced did not have any cementitious values.

Again using the mixing formulas of the present invention this clinker was further mixed with soluble $C\bar{S}$ anhydride and portland cement in the following proportions: 70% high $C_4A_3\bar{S}$ clinker, 20% portland cement type III, and 10% soluble $C\bar{S}$ anhydride. The resultant cement mixture contained approximately 22% $C_4A_3\bar{S}$, approximately 3% free C, approximately 10% $C\bar{S}$ anhydride and approximately 65% silicate ($C_3S$ and $C_2S$).

An aggregate was formed from this cement having a 1 to 1 ratio of cement to sand. Water was then added to the aggregate in the proportion of part water to 3 parts cement. The compressive strength of this molar composition was determined using the modified C109-cube strength test which produced the following results:

| Age | Compressive Strength |
| --- | --- |
| one hour | 5,000 psi |
| one day | 7,000 psi |
| seven days | 8,000 psi |
| twenty-eight days | 11,000 psi |

EXAMPLE II

As with Example I, an initial mixture of raw materials this time comprising bauxite instead of clay, limestone and gypsum was produced to form a raw material mixture for use in producing a high $C_4A_3\bar{S}$ clinker. The chemical analysis of the raw materials was as follows:

|  | Bauxite | Limestone | Gypsum |
| --- | --- | --- | --- |
| $SiO_2$ | 3.00% | 2.00% | 1.00% |
| $Al_2O_3$ | 55.00% | 0.70% | 0.50% |
| CaO | 2.00% | 55.00% | 34.00% |
| $Fe_2O_3$ | 27.00% | 0.50% | 0.20% |
| MgO | 0.00% | 0.60% | 0.60% |
| $K_2O$ | 11.00% | 0.15% | 0.05% |
| $SO_3$ | 0.00% | 0.10% | 43.00% |
| L.O.I. | 0.00% | 41.00% | 21.00% |
| $TiO_2$ | 3.00% | 0.00% | 0.00% |

Utilizing the mixing formulas of the present invention it was determined that after firing a clinker could be produced containing 62% $C_4A_3\bar{S}$ by combining 40% by weight bauxite with 40% by weight limestone and 20% by weight gypsum. Again, utilizing the mixing formulas of the present invention, the fired clinker was combined with portland type III cement and soluble $C\bar{S}$ anhydride in the proportions of 35% high $C_4A_3\bar{S}$ clinker, 10% soluble $C\bar{S}$ anhydride, and 55% portland type III cement to produce a final cement composition containing 20% $C_4A_3\bar{S}$.

When hydrated, the cement composition of Example II, exhibited a high heat of hydration reaching 75° C. at the final set. This high heat of hydration made the cement composition of Example II particularly well suited for applications in cold weather and sub-zero temperatures.

Those skilled in the art will appreciate that the range of $C_4A_3\bar{S}$ that may be produced in accordance with the teachings of the present invention in the initial fired clinker can vary widely. However, a $C_4A_3\bar{S}$ content of less than approximately 15%, though contemplated as being within the scope of the present invention, most likely would not be economically feasible. Conversely, depending upon the chemical composition of the raw materials involved in producing the original mixture for the clinker, a $C_4A_3\bar{S}$ content as high as approximately 75% is contemplated as being within the practical scope of the present invention.

Similarly, mixing ratios for the fired clinker, portland cement and soluble $C\bar{S}$ anhydride can also vary widely depending upon the desired percentage of $C_4A_3\bar{S}$ in the final cement composition. However, it is anticipated that the most economical cement compositions produced in accordance with the present invention will contain a weight percentage of $C_4A_3\bar{S}$ ranging from approximately 10% to 30%. Accordingly, the associated content of soluble $C\bar{S}$ anhydride will most economically vary from approximately 5% to 25%. The remainder of the composition can be formed of any type of hydraulic cement. However, it is preferred that the cement have a high content of the $C_3S$ phase. Thus, the remainder of the cement composition will preferably comprise portland type cement varying from approximately 45% to 85% by weight, depending upon the desired strength and other properties of the final hydraulic cement product.

In the foregoing description of the present invention, preferred exemplary embodiments of the invention have been disclosed It is to be understood that by those skilled in the art that other equivalent cement compositions are contemplated as being within the scope of the present invention. Accordingly, the present invention is not limited to the particular exemplary cement compositions which have been illustrated and described in detail herein.

What is claimed is:

1. A method for forming a very early setting, ultra high strength cement, said method comprising the steps of:

forming a mixture of limestone, gypsum, and one of more members from the group consisting of bauxite, kaolinite, and high alumina clay such that said mixture has an overall molar ratio of A/F greater than or equal to approximately 0.64 and an overall molar ratio $\bar{S}/A+F$ between approximately 0.35 and 0.25, where A, F and $\bar{S}$ are respectively, $Al_2O_3$, $Fe_2O_3$ and $SO_3$:

hearing said mixture to an elevated temperature on the order of 1,000° C. to 1,386 2000° C. for a sufficient period of time to form a clinker having a concentration of $C_4A_3\bar{S}$ between 15% and 75% by weight;

determining the $C_4A_3\bar{S}$ present in said clinker; and forming a final mixture of said clinker, CaO containing hydraulic cement and soluble $CaSO_4$ anhydride such that the composition of said final mixture includes a $C_4A_3\bar{S}$ content of 10% to 30% by weight and a soluble $CaSO_4$ anhydride content of 5% to 25% by weight.

2. The method of claim 1, further comprising the additional steps of:

preparing the pre-calibrated x-ray diffraction curve based upon reference standards for quantitatively analyzing a content of $C_4A_3\bar{S}$ present in a sample;

periodically removing a sample from said heated mixture;

quantitatively analyzing the content of $C_4A_3\bar{S}$ present in each of said samples through x-ray diffraction analyzers; and adjusting the temperature of said heated mixture accordingly to produce said concentration of $C_4A_3\bar{S}$.

3. A very early setting, ultra high strength cement produced in accordance with the method of claim 1 and having a compressive strength on the order of 3000 psi within approximately one hour following hydration.

4. A very early setting, ultra high strength cement produced in accordance with the method of claim 1 wherein the content of $C_4A_3\bar{S}$ present in said final mixture is between 15% to 25% by weight and said cement exhibits a compressive strength on the order of 3000 psi within approximately one hour following hydration.

5. A very early setting, ultra high strength cement produced in accordance with the method of claim 1 wherein the content $C_4A_3\bar{S}$ present in said final mixture is approximately 20% by weight, the content of soluble $CaSO_4$ anhydride is approximately 10% by weight and said cement exhibits a compressive strength on the order of 3000 psi within approximately one hour following hydration.

6. The very early setting, ultra high strength cement of claim 5 further comprising a super plasticizer additive.

7. The very early setting, ultra high strength cement of claim 5 further comprising a citric acid retarder.

8. The very early setting, ultra high strength cement of claim 5 further comprising an accelerator additive selected from the group consisting of aluminum sulfate, iron sulfate, or chloride accelerator.

9. A very early setting, ultra high strength cement consisting essentially of 10% to 30% by weight $C_4A_3\bar{S}$, 5% to 25% by weight soluble $CaSO_4$ anhydride and 45% to 85% by weight hydraulic cement and having a compressive strength on the order of 3000 psi within approximately one hour following hydration.

10. The very early setting, ultra high strength cement of claim 9 consisting essentially of 15% to 25% by weight of $C_4A_3\bar{S}$, 10% to 20% by weight soluble $CaSO_4$ anhydride, 55% to 75% by weight hydraulic cement and having a compressive strength on the order of 3000 psi within approximately one hour following hydration.

11. The very early setting, ultra high strength cement of claim 9 consisting essentially of approximately 20% by weight $C_4A_3\bar{S}$, approximately 10% by weight soluble $CaSO_4$ anhydride, approximately 70% by weight hydraulic cement and having a compressive strength on the order of 300 psi within approximately one hour following hydration.

12. A method for producing a very early setting, ultra high strength cement, said method comprising the steps of:

mixing predetermined amounts of S, A, C, F, and $\bar{S}$ containing raw materials, where S, A, C, F and $\bar{S}$ are, respectively $SiO_2$, $Al_2O_3$, CaO, $Fe_2O_3$, and $SO_3$;

subjecting said raw materials to a heat treatment at temperatures between 1,000° C. and 1,200° C. for a period of time sufficient to form a clinker containing approximately 15% to 75% by weight of $C_4A_3\bar{S}$;

determining the quantity of $C_4A_3\bar{S}$ present in said clinker; and mixing said clinker with C containing hydraulic cement and soluble $C\bar{S}$ anhydride according to the aqueous formula

$$H_2O, C_4A_3\bar{S}+2C+2C\bar{S}=C_6A\bar{S}_3\cdot aq+2CA\cdot aq$$

13. The method of claim 12 further comprising the additional steps of:

controlling the temperature of said heat treatment through periodic x-ray diffraction analysis to determine the content of $C_4A_3\bar{S}$ in said heat treated raw materials; and adjusting the temperature of said heat treated raw materials to produce said clinker.

14. A very early setting, ultra high strength cement produced in accordance with the method of claim 12 and having a compressive strength on the order of 3000 psi within approximately one hour following hydration.

15. A very early setting, ultra high strength cement produced in accordance with the method of claim 13 and having a compressive strength on the order of 3000 psi within approximately one hour following hydration.

* * * * *

UNITED STATES PATENT AND TRADEMARK OFFICE
CERTIFICATE OF CORRECTION

PATENT NO. : 4,957,556
DATED : September 18, 1990
INVENTOR(S) : Hassan Kunbargi

It is certified that error appears in the above-identified patent and that said Letters Patent is hereby corrected as shown below:

In the claims:

Column 11, line 13, change "hearing" to --heating--;

Column 11, line 14, change "1,386 2000" to --1,200--;

Column 11, line 35, change "analyzers" to --analysis--; and

Column 12, line 35, delete "of".

Signed and Sealed this

Twelfth Day of May, 1992

Attest:

DOUGLAS B. COMER

Attesting Officer

Acting Commissioner of Patents and Trademarks